Oct. 16, 1945.     K. R. WOOD ET AL     2,387,210
COMPARATOR
Filed June 8, 1942     4 Sheets-Sheet 1
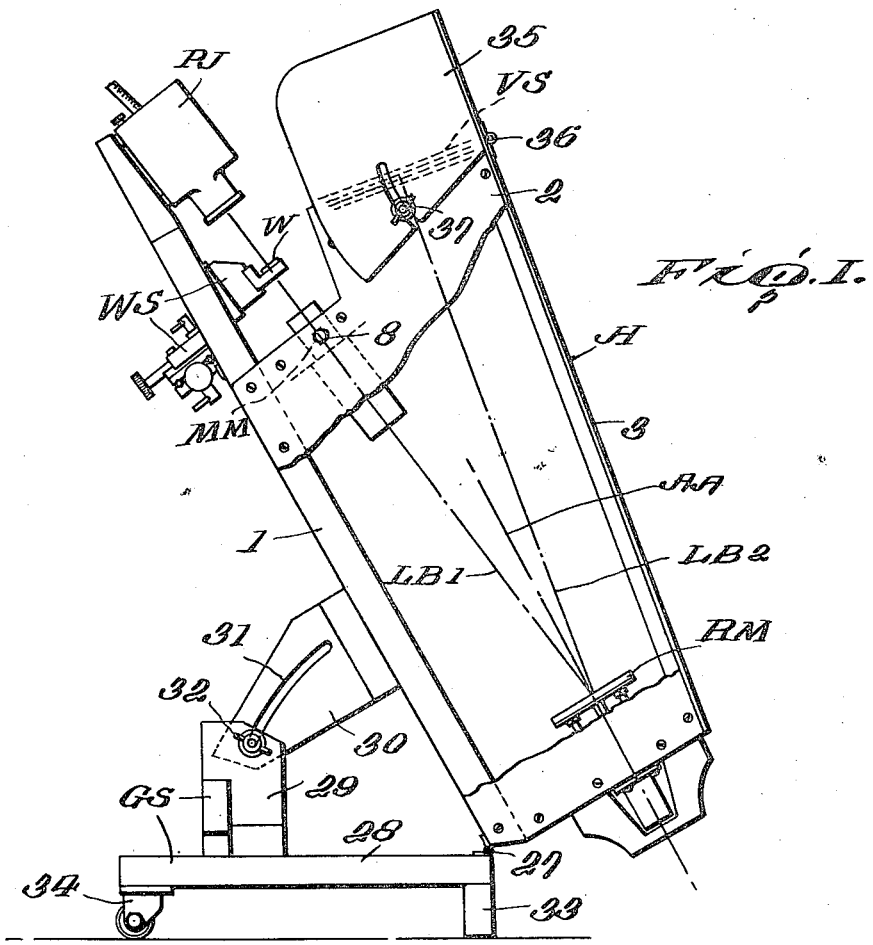
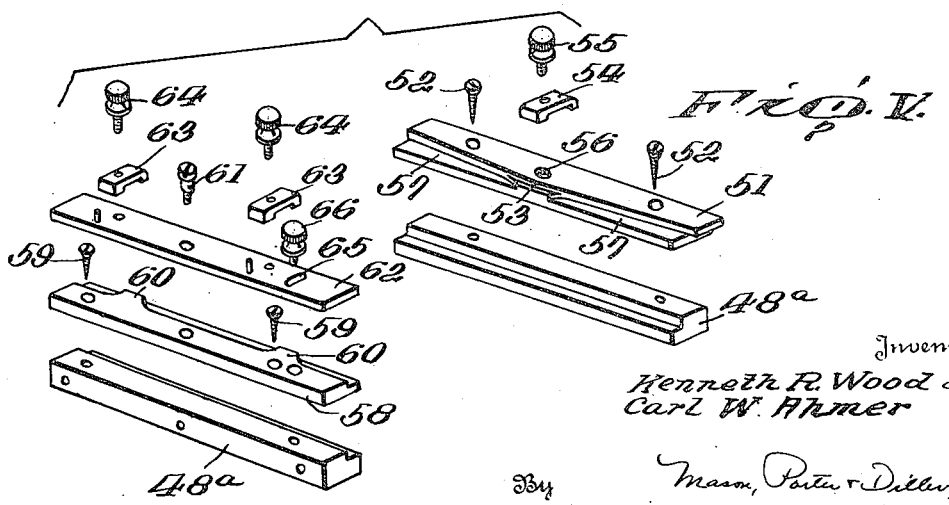

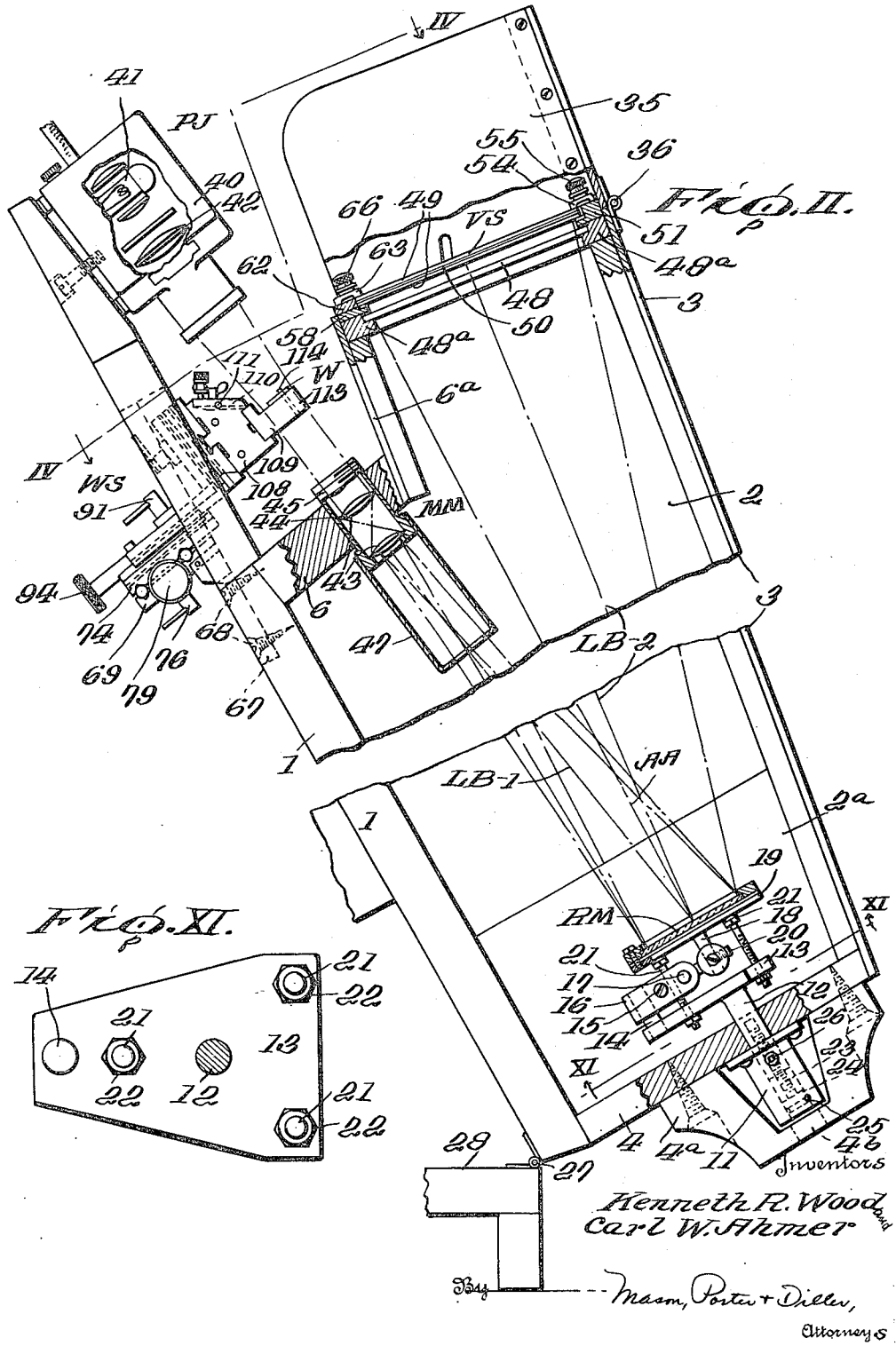

Oct. 16, 1945. K. R. WOOD ET AL 2,387,210
COMPARATOR
Filed June 8, 1942 4 Sheets-Sheet 3
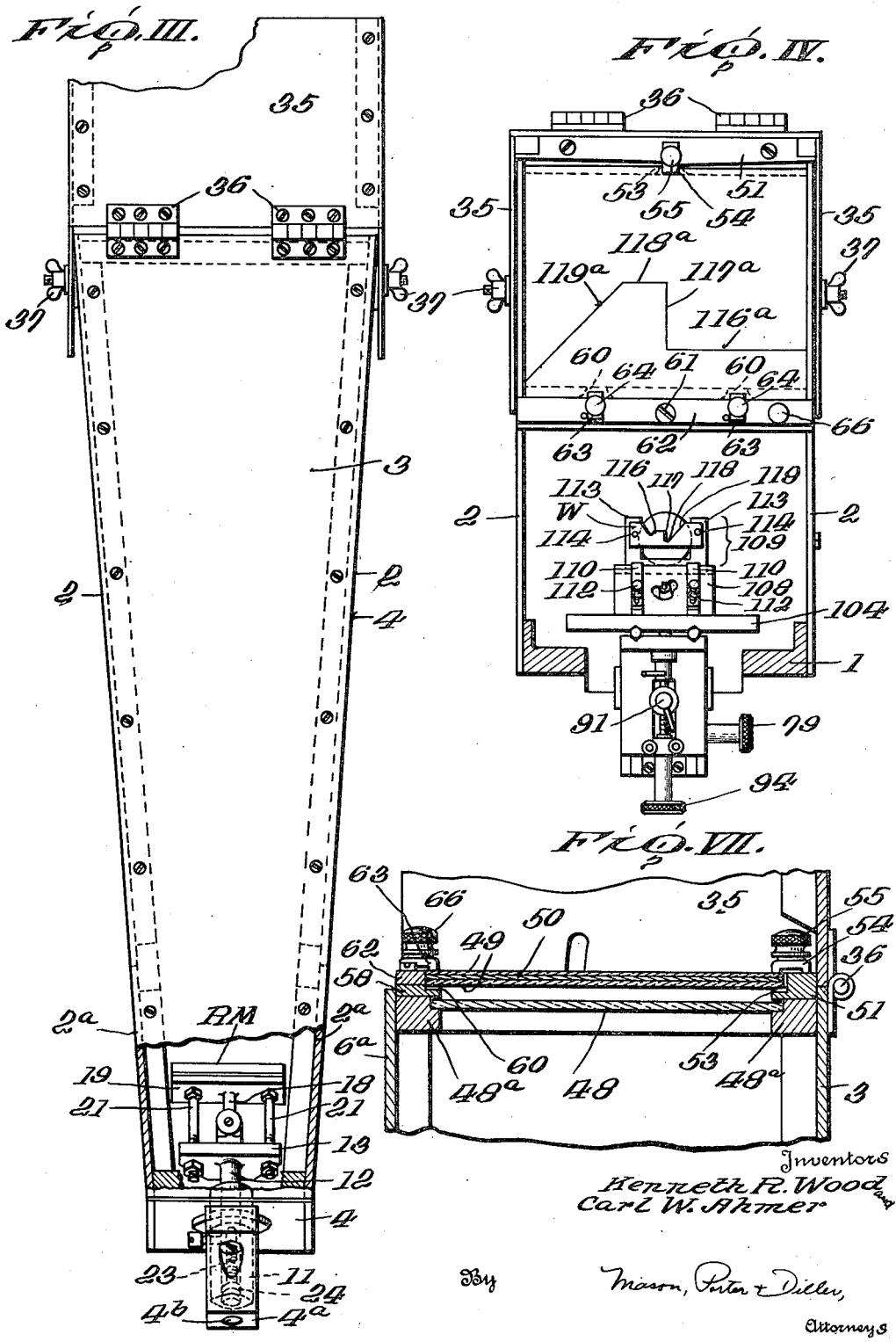

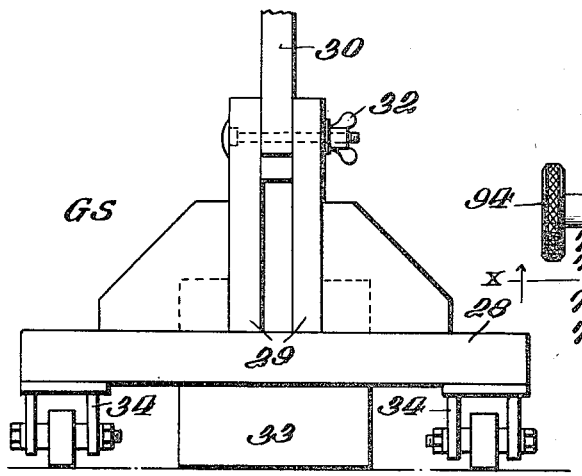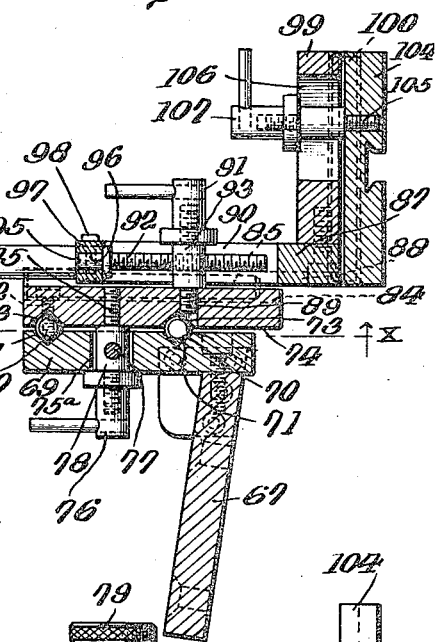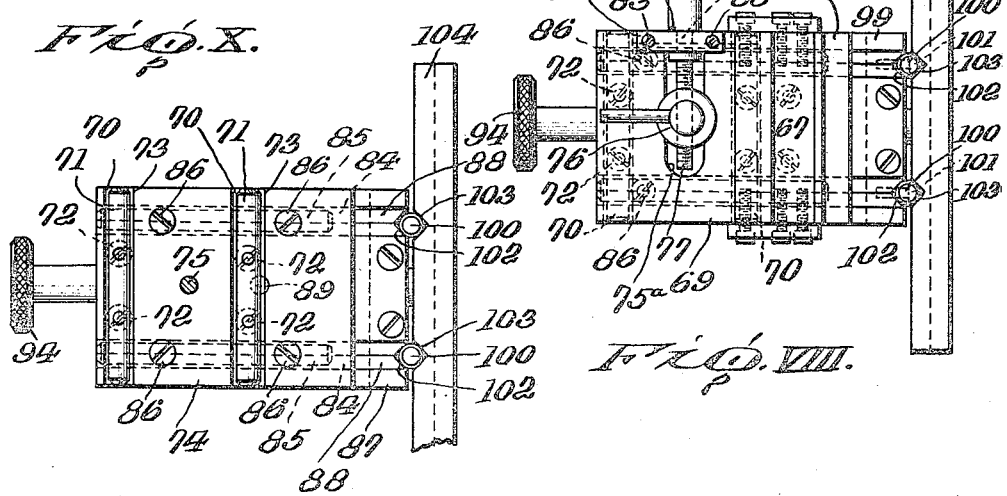

Patented Oct. 16, 1945

2,387,210

UNITED STATES PATENT OFFICE 2,387,210

COMPARATOR

Kenneth R. Wood and Carl W. Ahmer, Chicago, Ill., assignors to Union Special Machine Company, Chicago, Ill., a corporation of Illinois Application June 8, 1942, Serial No. 446,226

2 Claims. (Cl. 88—24)

An object of the above invention is to provide an instrument for comparing the enlarged shadow of the contour of an object with an equally enlarged standard contour drawn or otherwise imposed on a translucent screen to determine the degree of accuracy existing in the object to be tested, which instrument is so constructed as to permit economical manufacture and in which the parts are so arranged as not to require precise limits in the dimensions of its component parts.

Another object of the invention is to provide, in a comparator of the reflecting type, a mirror mounting so disposed that the mirror can be adjusted toward and from the viewing end of the projector to effect a variation in the degree of magnification without changing the position upon the viewing screen of a selected part of the enlarged shadow.

Still another object of the invention is to provide a comparator of the above type having a viewing screen which is disposed closer to the user than the work piece being compared and a screen-protecting hood which partially extends over the work piece so that at least a partial shielding of the screen from the light projected on the work piece is obtained.

A still further object is the construction of a comparator having the above advantages and which in addition is light in weight and readily portable.

Still another object is so to mount the comparator per se on a base as to enable the viewing end to be quickly adjustable to different elevations to accommodate either standing or seated users of different heights.

One manner in which the above-mentioned and other objects may be attained is disclosed in the attached drawings taken together with the following descrpition thereof; it being understood that equivalents and minor variations will be apparent to those skilled in the art.

In the drawings:

Figure I is a side elevation partly in section,

Figure II is a corresponding view on a large scale, with parts broken away to show details of the assembly, Figure III is a rear view of the projector, Figure IV is a top plan, partly in section, taken on the line IV—IV of Figure II, Figure V is an exploded view of the chart securing means, Figure VI is a front elevation of a preferred form of supporting carriage, Figure VII is a sectional view taken on the line VII—VII of Figure V, Figure VIII is a top view of the stage assembly, Figure IX is a sectional side elevation of the stage assembly, Figure X is a sectional view taken on the line X—X of Figure IX, and Figure XI is a bottom view of the mirror-supporting head on line XI—XI of Figure II.

As shown in Figure I, the structure includes a general support GS to which is hinged a comparator body or hood H. A work stage WS supports the piece of work W in the path of a beam of light from a projector PJ. This piece of work W is located at the focal plane of the microscope system MM which projects the image of the work as a beam of light, downwardly in the hood H and against a reflecting mirror RM, which reflects the beam upwardly and onto a translucent viewing screen VS located at the top of the hood H. The axis ray LB—1 of the beam from the microscope MM encounters the reflecting mirror RM and produces the reflected ray LB—2 which thus forms the axis of the reflected beam which is passed on to the viewing screen VS. It is preferred to adjust the parts so that this reflected ray LB—2 encounters the viewing screen VS at its center of effective area, which thus becomes a reference point which is invariable during further adjustment of the system. To secure this invariance, as will be set out in detail hereinafter, the reflecting mirror RM is mounted so that it can be moved linearly along the bisector AA of the angle between the two rays LB—1 and LB—2.

In th drawings, the device is shown with the viewing screen VS substantially horizontal, and with the hood located below this viewing screen; and the following description will, therefore, refer to the upper end of the hood as that shown near the top of the drawings, and the front of the apparatus will be described as the portion toward the left in Figures I and II; but it will be understood that the screen may be viewed from other directions if so desired, and that the hood may be adjusted in angle so that the rays LB—1 and LB—2 are approximately horizontal, particularly when the device is to be employed upon a table and by a seated operator.

The comparator body comprises a base member 1 which may, if desired, be a wood plank. Mounted on this base are side members 2 and 2a and a rear member 3, which in conjunction with the base member 1 form a light-excluding hood which is closed at its lower end by an end member 4 to which the adjacent ends of the side and rear members are attached. The hood has a top wall 6 which is located below the upper end of the base member 1. The base member extends beyond the top wall 6 to provide a support for a source of light which may, for example, be in the form of an ordinary commercial type of projector PJ. The top wall 6 is apertured to receive a system of magnifying lenses or microscope MM which is secured in position by a set screw 8. Above the top wall 6, the rear part of the hood projects upwardly beyond the top wall 6. A viewing screen VS is mounted at the extreme front end of the hood in a manner which will be hereinafter more particularly described. A closing wall 6a extends from the top wall 6 to the screen VS, to form with the walls 1, 2, 2a, 3, 4 and 6 a substantially light-tight hood. In front of the projecting portion of the hood the base member 1 has an aperture and carries a work holding stage WS extending through the aperture and having a work holder 109 which is adjustable in the directions of lines normal to each other and to the axis of the light beam projected by the projector PJ and also adjustable along a line parallel to said axis.

The optical system comprises the projector PJ which projects light upon a piece of work mounted in the work support WS, the projecting lens or microscope MM which is focused on the part of the piece of work which lies at the focal plane and delivers a beam of light, having an axial ray LB—1, into incidence upon the reflecting mirror RM, with a reflected beam, having an axial ray LB—2, which is projected upwardly again and upon the viewing screen VS, encountering the same at a right angle. The angle of incidence of the axial ray LB—1 and the angle of reflection of the axial ray LB—2 with the surface of the reflecting mirror RM are identical by the laws of optics; and the bisector AA of the anle between the rays LB—1 and LB—2 is in the plane of the incident and reflected rays and is normal to the surface of the reflecting mirror RM. To afford a maximum use of the available field, the projector PJ and the microscope MM are coaxially mounted, and a critical point of a work piece is preferably held by the work holder at the common axis, i. e. in line with the ray LB—1; and likewise the point of incidence of the reflected ray LB—2 upon the viewing screen VS is at the center of this screen. Therefore, when this condition has been established by the construction and adjustment of the parts, the shadowed image of the aforesaid critical point will appear at the center of the viewing screen VS.

Mounted for endwise movement in a socket or holder 11 carried on the outside of the end member 4 is a rod 12 which is confined to axial movement in said holder along a line which is coincident with the bisector of the angle formed by the intersection of a line normal to the surface of the screen VS at the center thereof and the axis of the light beam projected by the projector PJ. This may as illustrated be conveniently attained by tapering the upper end of the base member 1 to provide a surface 1a upon which the projector is attached to secure the light beam and the base at the intended angle of incidence of the light beam LB—1 upon the mirror, thereby permitting the end member 4 to be mounted at a right angle to the base, thus eliminating difficulties in forming and securing the end member at another angle. Within the hood, the rod 12 is provided with an integral T-shaped head 13 which has an upwardly projecting stud 14. Clamped to this stud by a clamp screw 15 is a rearwardly extending member 16 in the rear end of which is clamped a stud 17 which extends laterally and thence rearwardly from the member 16 and which at its end is provided with a ball head bored to receive a stud 18 projecting downwardly from a mirror supporting plate 19 and which is clamped in said ball head by set screws 20. Threaded into the heads of the T-head 13 (Figures II and XI) are bolts 21, 21 having heads which engage the back of the mirror assembly 19 to impart thereto the proper angular adjustment in assembly for positioning the mirror RM. Lock nuts 22, 22 are provided to secure the bolts 21, 21 when adjustment has been secured. The outer end of the rod 12 is internally threaded to be engaged by an adjusting screw 23 having a grooved head 24 which is engaged by a dowel pin 25 in the holder 11 so that turning of the screw 23 will effect bodily endwise movement of the rod 12 and the mirror system carried thereby. When the desired adjustment has been achieved, the rod 12 is locked in place by the set screw 26.

The socket 11 is preferably protected against contact with the floor or other objects by a guard 4a which is secured to the end wall 4, and has an aperture 4b to permit access to the head 24 of the adjusting screw 23.

In devices of this character it is desirable that the magnification obtained be of a predetermined ratio and that ratio be accurately achieved, so that the shadow of a standard device will accurately match the prepared comparison chart. This may be done by making parts which enter into the magnification with extreme and costly accuracy or by forming some part of the apparatus for adjustability whereby the ratio of magnification can be accurately determined during the assembly of the device. In the present invention the mirror is mounted for adjustment along the bisector line AA. In assembly, the mirror is first adjusted by bolts 12 for angular position until the shadow image of the said critical point of the work piece falls at the center of the viewing screen VS and then, by movement along the axial line AA of its mounting, the degree of magnification of the shadow image projected on the screen is varied until the desired ratio is established. It will be noted particularly that if the mirror were movable along a line not substantially the bisector of the angle between the incident and reflected beams endwise adjustment of the reflector would result in a relative upward or downward shift of the projected image, necessitating a further angular adjustment of the mirror, requiring again an endwise adjustment until the desired magnification and position of image on the screen is obtained. With the aforesaid primary adjustment of angular position, the shadow image of the critical point remains relatively fixed upon the viewing screen VS, and the size of the image increases or decreases in the radial directions away from this point. This, as previously pointed out, is avoided by making the several mirror adjustments independent of each other, with one affecting the position only of the image and the other affecting the size only of the image.

The base member 1 at its rear or lower end is connected by a hinge 27 to the support GS having a platform 28 which is provided with a bifurcated upstanding bracket 29 between the adjacent faces of which is received a sliding plate 30 secured to the underside of the base 1. The plate 30 is further provided with a slot 31 which is arcuately concentric with the axis of the hinge 27 and through which passes a clamp bolt 32 carried in the bracket 29.

If desired the support GS may be arranged for ready portability of the entire device, one such arrangement being illustrated. As shown, the platform 28 at its rear end is provided with a single leg 33 and at its forward end with a pair of casters 34. It will be apparent that it is necessary only to tilt the apparatus toward the user, thus lifting the leg 33 from the floor, and then the apparatus is free to be wheeled wherever desired. It will further be apparent that, by providing the platform with three points of support, the device can be used anywhere without regard for a possible unevenness of the floor.

A rockable light shield 35 may be provided at the upper end of the hood, to cut off lateral illumination from the viewing screen VS; this shield is shown as mounted by a hinge 36 and held in position by clamping screws 37.

The projector PJ (Figures I and II) includes a housing 40 in which is mounted a suitable lamp 41 and a condensing lens system 42. The microscope MM includes a series of suitable lenses 43 mounted in a tubular holder 44 which is externally provided with a coarse-pitch thread 45 engaged in the top wall 6 and held in an adjusted position by the locking screw 8. By this means the lens system may be properly located in assembly so that the focal plane will be in a proper position relative to the work holding stage. Once this is established there is no further need to change the location of the microscope MM except that which is incidental to the removal for the purpose of cleaning the lenses. Within the hood H, the microscope carries a shield and diaphragm 47 which cuts down the field projected by the lenses to eliminate undesirable color fringes from the projected images and to assure the interior of the hood against the presence of light other than that in the focused beam.

The viewing screen VS (Figure VII) comprises a sheet of plain glass 48 which rests in rebates on a frame composed of the members 48a and serves to seal the end of the hood, and a suitable translucent screen on which the shadow image of the object is projected. This screen may have chart outlines drawn thereon for use as a standard for or as a gauge to check the accuracy of the part being tested. This screen may be formed of a pair of plain glass plates 49, 49 with a sheet of translucent material 50 bearing suitable chart lines cemented between them or may be a single sheet of stiff transparent material such as glass frosted on one side and with suitable chart lines or other indicia marked or etched at the other side. Many other methods of preparing such comparison elements or stencils will suggest themselves to those skilled in the art. The essential thing is that the chart must be quickly mountable and demountable and must be so mounted as to be angularly and laterally shiftable to facilitate alignment with the shadow cast by a standard work piece held on the stage WS. To this end, (Figures II, V and VII) the the rear edge of the hood above the glass 48 carries a chart-supporting bar 51 affixed thereto by screws 52, 52. This bar 51 has a rebate at its edge, provided with a central raised chart-supporting ledge 53 which is opposed by a clamp member 54 which is held in place by a clamp screw 55 threaded into a collar 56 in the bar 51. At either side of the ledge 53 the rebate has clearance spaces 57, 57 and the walls upstanding from these parts of the rebate are directed at angles to the front edge of the bar to permit angular adjustment of the chart. At the front edge of the hood, above the glass 48, is a second chart-supporting bar 58 affixed to the end of the hood by screws 59, 59. This member does not extend beyond the chart and is provided with two chart supporting ledges 60, 60. Pivotally mounted on the bar 58 by means of a shoulder screw 61 is a rocking bar 62 provided with chart holding clamps 63, 63 and clamp screws 64, 64 which oppose the ledges 60, 60. The rocking bar 62 is further provided with a slot 65 through which extends a thumb screw 66 which is threaded into the bar 58 and serves to clamp the bar in any desired angular position. In setting up a chart, the chart is first set on the supporting ledges with the clamps loosely engaging the chart. Next a standard work piece is placed in a suitable work holder and, by adjustment of the work-holding stage WS, is brought into position to produce a sharp image at the approximate desired location upon the viewing screen VS. Finally, the chart is positioned angularly by tilting the bar 62 and laterally by the lateral bodily movement of the chart or the work piece until the proper relationship of chart lines and shadow is established, after which the chart clamp screws 55 and 64 and the thumb screw 66 are tightened, thus holding the chart in the desired position. Thereafter other work pieces can be placed in the work holder and their correctness can be judged by the relation of their projected shadows to the chart.

The work-holding stage WS comprises a support plate 67 fixed to the underside of the base 1 by screws 68. Fixed to the support plate 67 is a depending member 69 formed with a pair of parallel transverse V-grooves 70, 70 adapted to guide a pair of round bars 71, 71, held by screws 72 in a pair of grooves 73, 73 formed in a sliding member 74 and held in contact with the member 69 by a clamping stud 75 threaded into the member 74 and extending through a slot 75a in the member 69 to the opposite side thereof where it carries a thumb nut 76 by which the members 74 and 69 may be clamped in adjusted positions. Adjustment in a direction parallel to the bars 71 is effected by a screw 77 threaded into the enlarged central portion 78 of the stud 75; the screw 77 is provided with a hand wheel 79 and has a reduced diameter portion 80 which is engaged by a split bearing 81 on the member 69, which bearing includes the separable bearing cap 82 secured by screws 83.

To provide for adjustment of the work stage (Figures II, IV, IX and X) toward and from the base 1, the member 74 is further provided with a pair of parallel spaced V-grooves 84, 84 at right angles to the V-grooves 70, 70 and in which a pair of round bars 85, 85 are secured by screws 86. Sliding on these bars is a member 87 provided with matching V-grooves 88, 88, which member is held in contact with the bars 85, 85 by a stud 89 threaded into the member 74 and which extends through a slot 90 in the member 87 and exteriorly thereof carries a thumb nut 91. Adjustment of the member 87 in a direction parallel to the bars 85, 85, is achieved by a screw 92 threaded into the enlarged center portion 93 of the stud 89, which screw is provided with a hand wheel 94 and has a reduced diameter portion 95 which is journaled in a split bearing 96 formed in the member 89 and including the removable bearing cap 97 and screws 98.

The member 87 at its inner end is provided with a forwardly extending portion 99 which receives a pair of parallel round bars 100, 100 which are secured by screws 101 in the V-grooves 102, 102, which extend parallel to the light beam and at right angles to the V-grooves 70, 70 and 84, 84. These bars engage the V-grooves 103, 103 formed in the face of the sliding block 104 of work-holding stage WS so that the block 104 slides freely along these bars in a direction parallel with the axis of the incident light beam. Threaded into sliding block 104 is a stud 105 which projects through a slot 106 in the portion 99 of the member 89 and exteriorly thereof carries a thumb nut 107 by which the stage can be locked in adjusted position. If desired, this adjustment may be effected by a hand screw structure similar to that by which the adjustments along bars 71, 71 and 85, 85 are effected, but experience has indicated that such is not required since the purpose of this adjustment is merely to bring the part being inspected into a sharp focus; and by proper design of the work-holding fixtures, such adjustments are unnecessary.

For the purpose of illustrating a typical use of this comparator, there is shown (Figures II and IV) a sub-base 108 mounted on the upper sliding block for supporting a work-holding fixture 109 which is secured thereon by pinch levers 110, 110 pivoted at 111 and actuated by thumb screws 112, 112. The work holder 109 is formed with spaced arms 113, 113, each having a projecting dowel pin 114 corresponding to calibrated apertures in the work pieces to be inspected, and on which a work piece W is mounted.

In the illustrated use, the location of the edges 116, 117, 118 and 119 of the flat work piece relative to the holes through which the dowel pins 114 pass is being checked and the front surface of the work piece is held at the focal plane by the work stage. The image will be reflected in inverted form on the screen and will be checked against the corresponding lines 116a, 117a, 118a and 119a on the chart, (Figure IV).

Other types of work holders may be constructed and employed in accordance with the shape of the work piece and the portion thereof which is to be inspected, being provided with devices against which portions of the work pieces abut for locating the successive work pieces in identical positions with the desired parts of the work positioned at the focal plane and in proper relation for projection of their shadows upon the viewing screen VS.

The operation of the instrument is simple. When constructed and initially adjusted so that the focal plane, microscope and mirror are coordinated to present an image of proper ratio and in proper position upon the viewing screen VS, the work stage WS can be fitted with various work holders in accordance with the work piece to be inspected.

The operator energizes the lamp bulb 41 for illumination and places a work piece in the work holder, by introducing it as with any tool fixture. Its image is thereupon projected onto the viewing screen VS and may be compared, at the magnification afforded, with the chart. Errors in the work piece will appear, in the illustrated form, by the presence of shadow at one or the other side of the true position represented by the lines 116a—119a of Figure IV.

After the first work piece has been inspected, it is removed, and another work piece substituted.

It will be noted that this inspection is accomplished, after initial adjustment of the comparator as a whole and of the work stage WS for the particular piece of work, without any other operation than the manual insertion and removal of work pieces and visual inspection of their images; and hence the operations can be performed by a relatively unskilled inspector.

It is obvious that the invention is not limited to the particular form or details of construction, but may be practiced in many ways within the scope of the appended claims.

We claim:

1. An optical comparator having a housing, a viewing screen fixed across an opening of the housing, a lamp fixed on the housing, a work holder and a mount on the housing therefor, a projecting lens fixedly mounted on the housing for projecting thereinto a light beam from the lamp, a mirror in the housing for reflecting the light beam toward the screen, a work mount including means for adjusting the work piece until a selected part thereof is at the axial light ray through the projecting lens, together with a mirror-supporting assembly arranged on the housing opposite the opening and including a member adjustable for determining the scale of enlargement produced by the comparator by bodily movement toward and from the lens and screen along a line lying within the angle formed at the mirror by the incident axial light ray from the projecting lens and the corresponding reflected axial ray, said member having a universal joint connected to the mirror and devices for moving the mirror about axes of said universal joint at angles to the directions of said axial rays and effective for maintaining the mirror in an angular position in which the angle between the incident and reflected axial light rays is bisected by the line of said bodily movement of the said member, a chart at the screen having lines indicating the position and size of the image of a standard piece of work, and means for shifting the chart laterally and angularly until the reflected axial ray falls upon the part of the chart corresponding to said selected part of the standard work piece and the said chart lines coincide with corresponding parts of the image of a standard piece of work, whereby the bodily movement of the adjusted mirror is effective to correlate the size of the said standard image with the chart lines.

2. An optical comparator comprising a supporting member, a source of light mounted adjacent one end of said member for projecting a light beam along the length of said member, a panel fixedly projecting from the supporting member intermediate its ends and having an aperture, a lens fixed on the panel for focusing the light beam through said aperture, housing walls fastened to said member and panel for providing a substantially light-tight chamber having one end extended beyond the panel and closely adjacent thereto, whereby a selected point of the work can be brought to a predetermined part of the light beam, a screen fixedly mounted across an opening on the extended end of the chamber, means for providing at the screen a representation of the standard article for comparison, said representation being of a predetermined enlarged size and in predetermined orientation upon the screen with the point corresponding to said selected part of this work occupying a predetermined location within the area of the screen, a mirror in the chamber for reflecting the said light beam toward the screen, supporting means for the mirror including a device whereby the mirror is guided for bodily movement toward and from the lens and screen along a line lying between the incident and reflected rays from said selected part, and also including means for angularly adjusting the mirror relative to the direction of said bodily movement into an angular position on said device at which the line of said bodily movement lies along the bisector of the angle between the incident and reflected rays from said selected part, whereby the mirror may be moved along said line of bodily movement for adjusting the size of the projected shadow outline of the work upon the screen without changing the screen position of said reflected ray from said selected part.

KENNETH R. WOOD.
CARL W. AHMER.